United States Patent
Shimada et al.

(10) Patent No.: US 11,024,196 B2
(45) Date of Patent: Jun. 1, 2021

(54) CONTROL DEVICE, CONTROL METHOD, INFORMATION PROCESSING DEVICE, INFORMATION PROCESSING METHOD, AND PROGRAM

(71) Applicant: VIVITA JAPAN, INC., Fukuoka (JP)

(72) Inventors: Shozaburo Shimada, Fukuoka (JP);
Kazutoshi Kashimoto, Fukuoka (JP);
Siddharth Vijay Pillai, Fukuoka (JP);
Shintaro Itamoto, Fukuoka (JP)

(73) Assignee: VIVITA JAPAN, INC., Fukuoka (JP)

( * ) Notice: Subject to any disclaimer, the term of this patent is extended or adjusted under 35 U.S.C. 154(b) by 0 days.

(21) Appl. No.: 16/488,312

(22) PCT Filed: Feb. 21, 2018

(86) PCT No.: PCT/JP2018/006178
§ 371 (c)(1),
(2) Date: Aug. 23, 2019

(87) PCT Pub. No.: WO2018/155483
PCT Pub. Date: Aug. 30, 2018

(65) Prior Publication Data
US 2019/0378433 A1 Dec. 12, 2019

(30) Foreign Application Priority Data

Feb. 24, 2017 (JP) .............................. JP2017-034019

(51) Int. Cl.
*G06F 3/0481* (2013.01)
*G06F 3/0482* (2013.01)
(Continued)

(52) U.S. Cl.
CPC ........... *G09B 19/0053* (2013.01); *G06F 8/34* (2013.01); *G06F 9/45504* (2013.01);
(Continued)

(58) Field of Classification Search
None
See application file for complete search history.

(56) References Cited

U.S. PATENT DOCUMENTS 8,874,093 B2* 10/2014 Zotov ........................ G06F 8/34
455/418
9,854,654 B2* 12/2017 Gan ..................... G06F 3/04817
(Continued)

FOREIGN PATENT DOCUMENTS

EP 2747402 A1 6/2014
JP H10108985 A 4/1998
(Continued)

OTHER PUBLICATIONS

EPO Extended Search Report for corresponding EP Application No. 18757573.3 dated Mar. 23, 2020.
(Continued)

*Primary Examiner* — Tuan A Tran
(74) *Attorney, Agent, or Firm* — Cantor Colburn LLP

(57) ABSTRACT

In order to enable a user to produce a program by means of visible operations, a pairing unit pairs a user terminal and a basic core. A program production unit produces a program on the basis of touch operations by the user. An H parts supply unit and an S parts supply unit respectively supply H parts and S parts to the program production unit. A parts connection unit connects the various H parts and S parts in accordance with touch operations by the user. A program execution unit extracts from a program storage unit a program to be executed, and executes that program. A communication control unit transmits the execution result for the program executed by the program execution unit to the basic core via a second close-range communication unit.

9 Claims, 13 Drawing Sheets

(51) Int. Cl.
*G06F 3/0484* (2013.01)
*G06F 9/44* (2018.01)
*G09B 19/00* (2006.01)
*G06F 8/34* (2018.01)
*G06F 9/455* (2018.01)
*H04B 5/00* (2006.01)
*H04B 5/02* (2006.01)

(52) U.S. Cl.
CPC ....... *G09B 19/0069* (2013.01); *H04B 5/0025* (2013.01); *H04B 5/02* (2013.01)

(56) References Cited

U.S. PATENT DOCUMENTS

| | | | |
|---|---|---|---|
| 9,886,243 B2* | 2/2018 | Eo | G06F 8/34 |
| 9,971,484 B2* | 5/2018 | Kang | G06F 3/0482 |
| 2001/0056306 A1 | 12/2001 | Nakai et al. | |
| 2008/0113683 A1* | 5/2008 | Paas | H04M 1/72519 |
| | | | 455/552.1 |
| 2009/0005071 A1* | 1/2009 | Forstall | H04W 4/029 |
| | | | 455/456.1 |
| 2010/0311300 A1 | 12/2010 | Hansen et al. | |
| 2013/0229690 A1 | 9/2013 | Sumita et al. | |
| 2014/0380239 A1* | 12/2014 | Kang | G06F 3/04842 |
| | | | 715/810 |
| 2015/0220246 A1* | 8/2015 | Glover | G06F 3/04817 |
| | | | 715/783 |
| 2015/0242189 A1* | 8/2015 | Eo | G06F 8/31 |
| | | | 717/109 |
| 2016/0057298 A1 | 2/2016 | Sasase | |
| 2016/0085431 A1* | 3/2016 | Kim | G06F 3/04817 |
| | | | 715/735 |
| 2016/0291912 A1 | 10/2016 | Baba | |
| 2017/0052678 A1* | 2/2017 | Karasawa | G06F 3/04817 |

FOREIGN PATENT DOCUMENTS

| | | |
|---|---|---|
| JP | 2002007299 A | 1/2002 |
| JP | 2011500116 A | 1/2011 |
| WO | 2009047225 A1 | 4/2009 |
| WO | 2015174120 A1 | 11/2015 |

OTHER PUBLICATIONS

International Search Report corresponding to Application No. PCT/JP2018/006178; dated May 29, 2018.

* cited by examiner

CONTROL DEVICE, CONTROL METHOD, INFORMATION PROCESSING DEVICE, INFORMATION PROCESSING METHOD, AND PROGRAM

CROSS REFERENCE TO RELATED APPLICATIONS

This is the U.S. national stage of application No. PCT/JP2018/006178, filed on Feb. 21, 2018. Priority under 35 U.S.C. § 119(a) and 35 U.S.C. § 365(b) is claimed from Japanese Application No. 2017-034019, filed Feb. 24, 2017; the disclosures of which are incorporated herein by reference.

TECHNICAL FIELD

The present invention relates to a control device, a control method, an information processing device, an information processing method, and a program.

BACKGROUND ART

In the past, provision of toy assemblies for the purpose of educating children has widespread, and a number of related technologies have been proposed (for example, Patent Document 1). For example, according to the technology described in Patent Document 1, assembly blocks capable of constructing a toy assembly by simple wiring or programming are provided. According to the technology described in Patent Document 1, even users of low age can construct a toy assembly without performing complicated works or operations.

Patent Document 1: Japanese Unexamined Patent Application, Publication No. H10-108985

DISCLOSURE OF THE INVENTION

Problems to be Solved by the Invention

However, in the technology of Patent Document 1 described above, each assembly block is singly controlled by the existing program, and there is a limit to a degree of freedom of movement or control of the toy assembly. That is, for example, only with the technology of Patent Document 1 described above, a process of producing a program by combining respective functions of the assembly blocks is unable to be executed. In other words, with the technology of Patent Document 1 described above, it is necessary to separately produce complicated program in order to execute, for example, an advanced process of combining the respective functions of the assembly blocks.

The present invention was made in light of the foregoing and provides a technology that enables the user to more easily produce a complex program by means of visual operations.

Means for Solving the Problems

In order to achieve the above object, a control device of one aspect of the present invention is
a control device in an information processing system including the control device, one or more first hardware devices having a function of pairing with the control device through near field communication and a function of communicating with another hardware device, and one or more second hardware devices having a function of communicating with the first hardware devices and a function of fulfilling a predetermined function, the control device including:
a control execution means that executes control of combining a plurality of sets of the first hardware device and the second hardware device and causing a predetermined series of processes to be executed;
a pairing execution means that executes pairing between the first hardware device serving as a control target of the control execution means and the control device in accordance with near field communication of a predetermined scheme; and
a presentation means that presents a state of the pairing between the first hardware device serving as the control target of the control execution means and the control device.

A control method, an information processing device, an information processing method, and a program of one aspect of the present invention are also provided as a control method, an information processing device, an information processing method, and a program corresponding to the information processing system of one aspect of the present invention.

Effects of the Invention

According to the present invention, it is possible to provide a technology that enables the user to produce a complicated program more easily by means of visual operations.

PREFERRED MODE FOR CARRYING OUT THE INVENTION

Hereinafter, an exemplary embodiment of the present invention will be described with reference to the appended drawings.

The present invention is creation of a technical idea that enables the user to produce a complicated program more easily by means of visual operations. The user can produce a program by operating various types of icons displayed on a user interface (hereinafter referred to as a "program production screen") displayed for program production. Specifically, for example, the user can recognize an icon (hereinafter referred to as "hardware parts" or "H parts") indicating content of a program designating an operation of specific hardware displayed on the program production screen and an icon (hereinafter referred to as "software parts" or "S parts") indicating content of a program designating execution of specific software. Further, the user produces a program by moving the icons arbitrarily (for example, Drag and Drop or the like) and combining various types of icons. The program produced in this manner can be used, for example, as a toy assembly or the like. In other words, an information processing system according to one embodiment of the present invention can produce a program by means of easy operations and thus is extremely useful as a teaching material for teaching a mechanism or a production method of a program to children.

Figure 1:
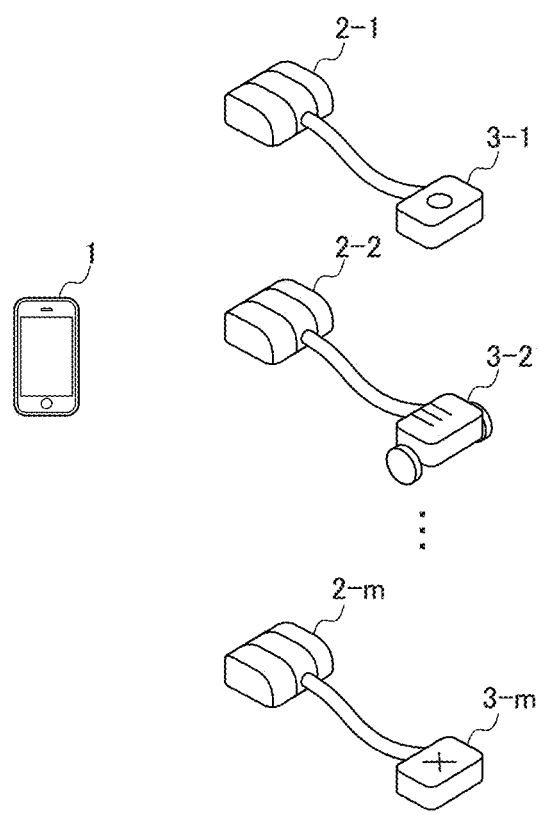
FIG. 1 is a block diagram illustrating a configuration of an information processing system according to an embodiment of the present invention.

FIG. 1 is a block diagram illustrating a configuration of an information processing system according to an embodiment of the present invention. The information processing system illustrated in FIG. 1 includes a user terminal 1 used by the user, m basic cores 2-1 to 2-m (m is any integer value of 1 or more), and m functional modules 3-1 to 3-m. Further, the user terminal 1 communicates with each of the basic cores 2-1 to 2-m in accordance with various types of schemes such as, for example, Near Field Communication (NFC (registered trademark)), Bluetooth (registered trademark) and the like. Hereinafter, when it is not necessary to distinguish each of the basic cores 2-1 to 2-m individually, they are referred to collectively as a "basic core 2," and when it is not necessary to distinguish each of the functional modules 3-1 to 3-m individually, they are referred to collectively as a "functional module 3."

Here, the basic core 2 and the functional module 3 used in the present embodiment are briefly described. The basic core 2 is a hardware device which is used in a state connected to the functional module 3 to be described later and performs pairing with the user terminal 1 by near field communication (for example, communication conforming to an NFC (registered trademark) standard). The user terminal 1 performs pairing with a predetermined basic core 2-K and recognizes the basic core 2-K (K is an integer value out of 1 to m) and a predetermined functional module 3-K connected with the basic core 2-K. The functional module 3-K is, for example, a hardware device constituted by various types of sensors such as a temperature sensor, an operation tool such as a buzzer, a driving tool such as a motor or a fan, or the like.

Here, the pairing between the user terminal 1 and the basic core 2-K as described above will be described. In the present embodiment, it is necessary to perform pairing for the user terminal 1 and the basic core 2-K using near field communication when a program associated with at least an operation of the functional module 3-K connected to the basic core 2-K is produced. In short, the pairing means an operation of causing the user terminal 1 to recognize types, connection states, and the like of the basic core 2-K and the functional module 3-K connected to the basic core 2-K using near field communication. Further, as will be described later in detail, in the user terminal 1, when the type, the connection state, or the like of functional module 3-K is recognized, the H parts corresponding to the connected functional module 3-K are displayed on the program production screen.

Figure 2:
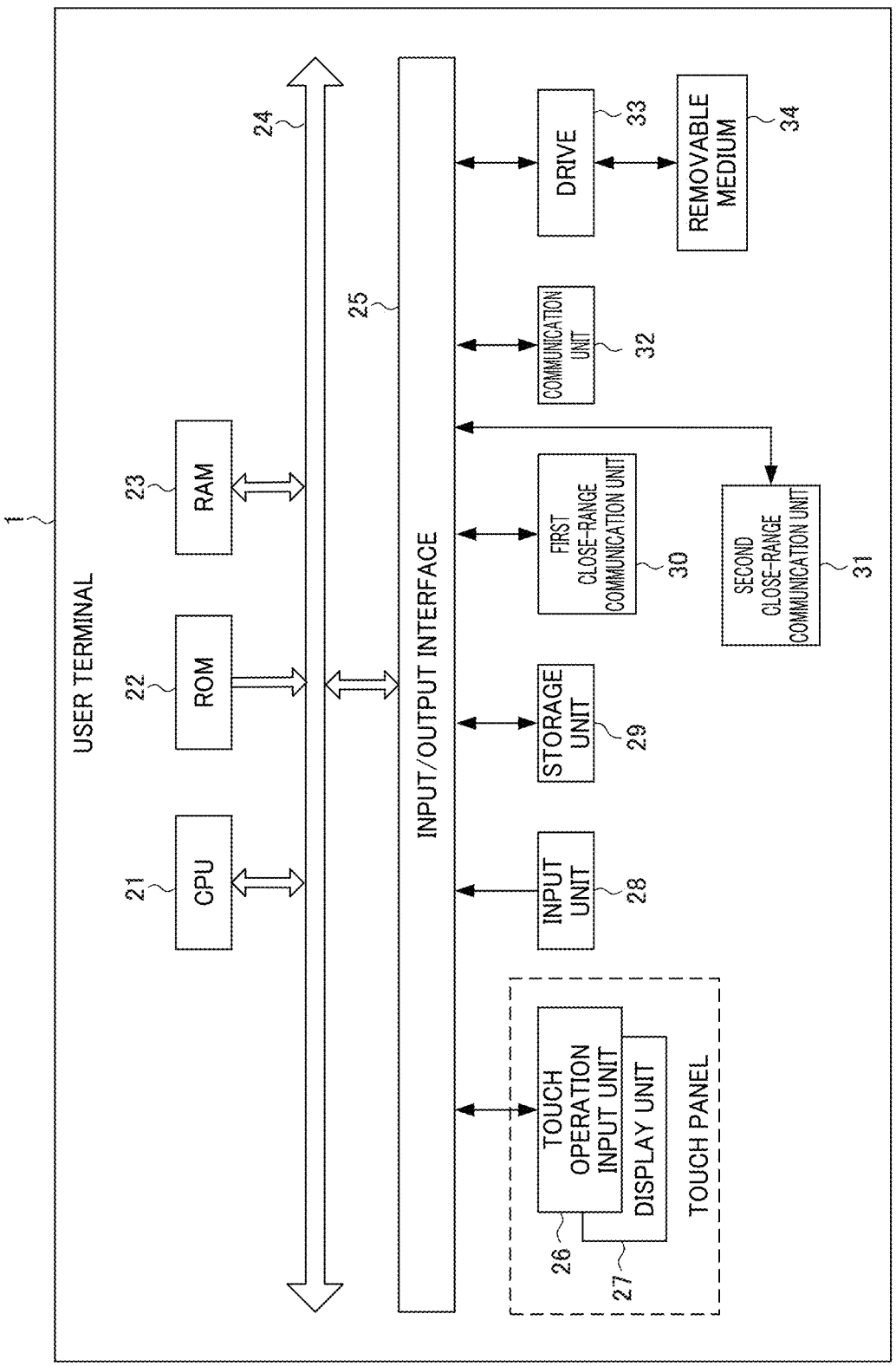
FIG. 2 is a block diagram illustrating an example of a hardware configuration of a user terminal according to an embodiment of the present invention.

FIG. 2 is a block diagram illustrating a hardware configuration of the user terminal 1 according to an embodiment of the present invention.

The user terminal 1 is constituted by a tablet or the like. The user terminal 1 includes a central processing unit (CPU) 21, a read only memory (ROM) 22, a random access memory (RAM) 23, a bus 24, an input/output interface 25, and a touch operation input unit 26, A display unit 27, an input unit 28, a storage unit 29, a first close-range communication unit 30, a second close-range communication unit 31, a communication unit 32, a drive 33, and a removable medium 34.

The CPU 21 executes various types of processes in accordance with a program stored in the ROM 22 or a program loaded from the storage unit 29 into the RAM 23. Information and the like which are necessary for the CPU 21 to execute various processes are also stored in the RAM 23 as appropriate.

The CPU 21, the ROM 22, and the RAM 23 are connected to one another via the bus 24. The input/output interface 25 is also connected to the bus 24. The touch operation input unit 26, the display unit 27, the input unit 28, the storage unit 29, the first close-range communication unit 30, the communication unit 32, and the drive 33 are connected to the input/output interface 25. The second close-range communication unit 31 is also disposed.

The touch operation input unit 26 is constituted by, for example, a capacitive or resistive (pressure-sensitive) position input sensor stacked on the display unit 27 and detects coordinates of a position at which the touch operation is performed. The display unit 27 is constituted by a display such as a liquid crystal display and displays various types of images such as images related to program production. As described above, in the present embodiment, a touch panel is constituted by the touch operation input unit 26 and the display unit 27.

The input unit 28 includes various types of hardware or the like and receives various types of information in accordance with an instruction operation of the user. The storage unit 29 is constituted by a hard disk, a dynamic random-access memory (DRAM), or the like and stores various types of information. The first close-range communication unit 30 executes, for example, control such that near field communication is performed in accordance with a scheme conforming to the NFC (registered trademark) standard. Specifically, for example, as described above, the user terminal 1 and the basic core 2 perform near field communication in according to a scheme conforming to the NFC (registered trademark) standard, and perform pairing. The second close-range communication unit 31 executes, for example, control such that near field communication is performed in accordance with a scheme conforming to the Bluetooth (registered trademark) standard. Specifically, for example, an execution result (including a command or the like) of the program produced by the user terminal 1 is transmitted by the near field communication of the scheme conforming to the Bluetooth (registered trademark) standard. The communication unit 32 controls communication with other devices via the Internet or the like separately from and independently of the first close-range communication unit 30 and the second close-range communication unit 31.

The drive 33 is disposed if necessary. The removable medium 34 constituted by a magnetic disk, an optical disk, a magneto-optical disk, a semiconductor memory or the like is appropriately loaded into the drive 33. A program read from the removable medium 34 by the drive 33 is installed in the storage unit 29 if necessary. The removable medium 34 can also store various types of information stored in the storage unit 29, similarly to the storage unit 29.

Figure 3:
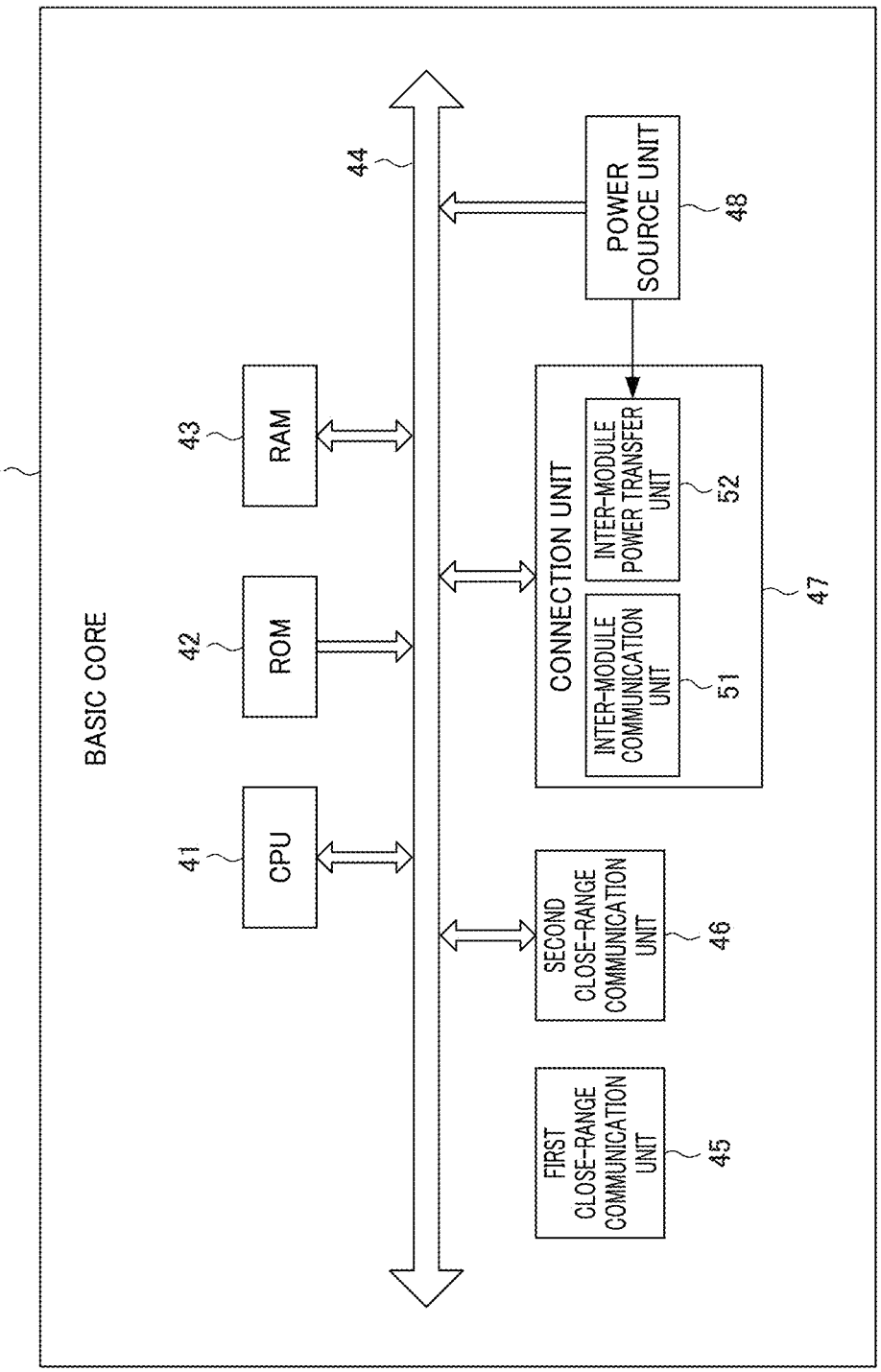
FIG. 3 is a block diagram illustrating an example of a hardware configuration of a basic core according to an embodiment of the present invention.

FIG. 3 is a block diagram illustrating a hardware configuration of the basic core 2 according to an embodiment of the present invention.

The basic core 2 is configured by a predetermined hardware device or the like. The basic core 2 includes a CPU 41, a ROM 42, a RAM 43, a bus 44, a first close-range communication unit 45, a second close-range communication unit 46, a connection unit 47, and a power source unit 48.

Among the components of the basic core 2, the CPU 41, the ROM 42, the RAM 43, the bus 44, the first close-range communication unit 45, and the second close-range communication unit 46 are basically similar to the components of the user terminal 1, and thus description thereof is omitted here.

The connection unit 47 establishes a connection with other hardware devices (for example, the functional module 3 in FIG. 1). Also, the connection unit 47 includes an inter-module communication unit 51 and an inter-module power transfer unit 52. The inter-module communication unit 51 executes control such that data communication is performed, for example, in accordance with a scheme conforming to a local area network (LAN) standard. The inter-module power transfer unit 52 receives electric power supplied from the power source unit 48 to be described later and transfers electric power to other hardware devices (for example, the functional module 3 in FIG. 1). The power source unit 48 is a battery such as a battery cell. The power source unit 48 supplies electric power to the basic core 2 and appropriately supplies electric power to the functional module 3 via the inter-module power transfer unit 52.

Figure 4:
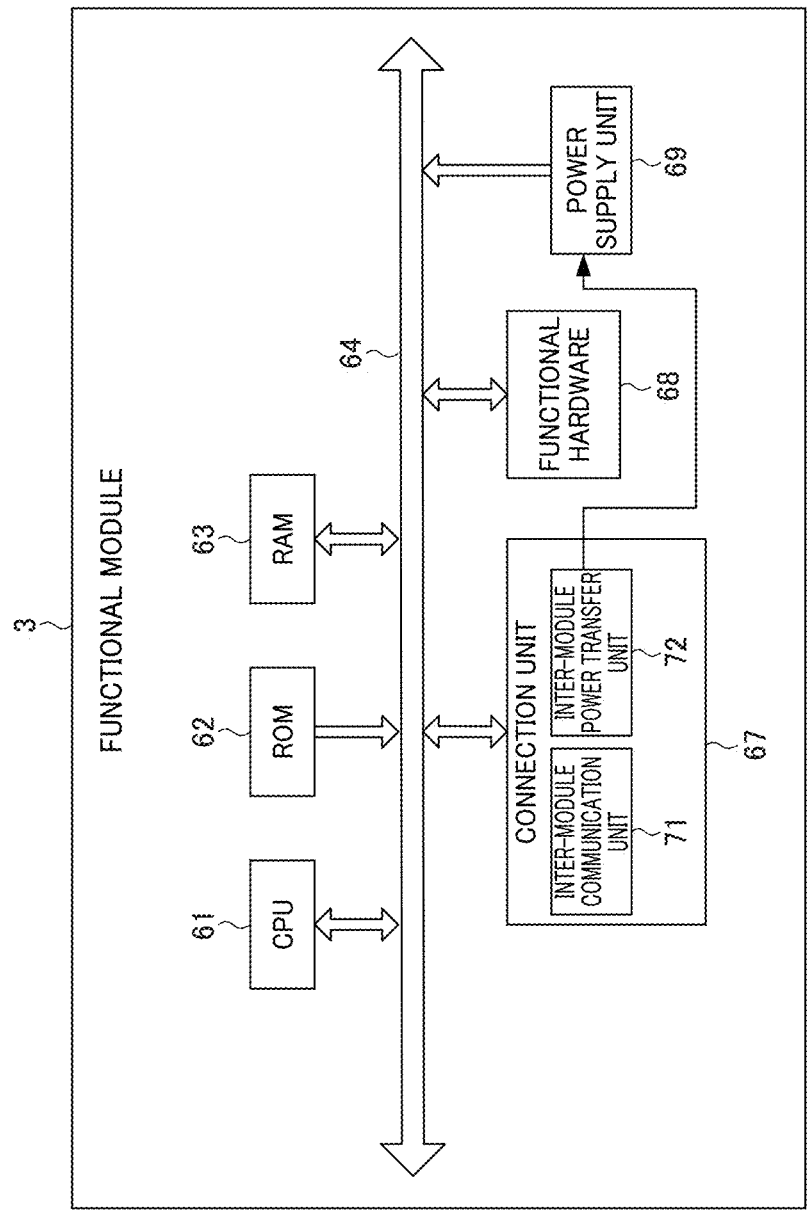
FIG. 4 is a block diagram illustrating an example of a hardware configuration of a functional module according to an embodiment of the present invention.

FIG. 4 is a block diagram illustrating a hardware configuration of the functional module 3 according to an embodiment of the present invention.

The functional module 3 is constituted by a predetermined hardware device or the like. The functional module 3 includes a CPU 61, a ROM 62, a RAM 63, a bus 64, a connection unit 67, a functional hardware 68, and a power supply unit 69.

Among the components of the functional module 3, the CPU 61, the ROM 62, the RAM 63, the bus 64, and the connection unit 67 are basically similar to the components of the user terminal 1 or the basic core 2, and thus description thereof is omitted here. A first close-range communication unit and a second close-range communication unit may be disposed in the functional module 3, similarly to the basic core 2.

The functional hardware 68 is, for example, a temperature sensor or a buzzer, and is hardware or the like that enables each functional module to fulfill its own function. That is, the program produced by the user is reflected on actual hardware when the functional hardware 68 properly fulfills its function. Here, in the present embodiment, there are two types of execution methods as program execution. That is, a type of virtually executing the program produced by the user terminal 1 with only the user terminal 1 is referred to as "execution by simulation." On the other hand, a type of causing the functional hardware 68 or the like to operate on the basis of an execution result of the program produced by the user terminal 1 is referred to as "execution by actual machine."

The power supply unit 69 supplies electric power obtained via an inter-module power transfer unit 72 or electric power supplied from an external power supply (for example, a battery unit BU in FIG. 5) to the functional module 3.

Figure 5:
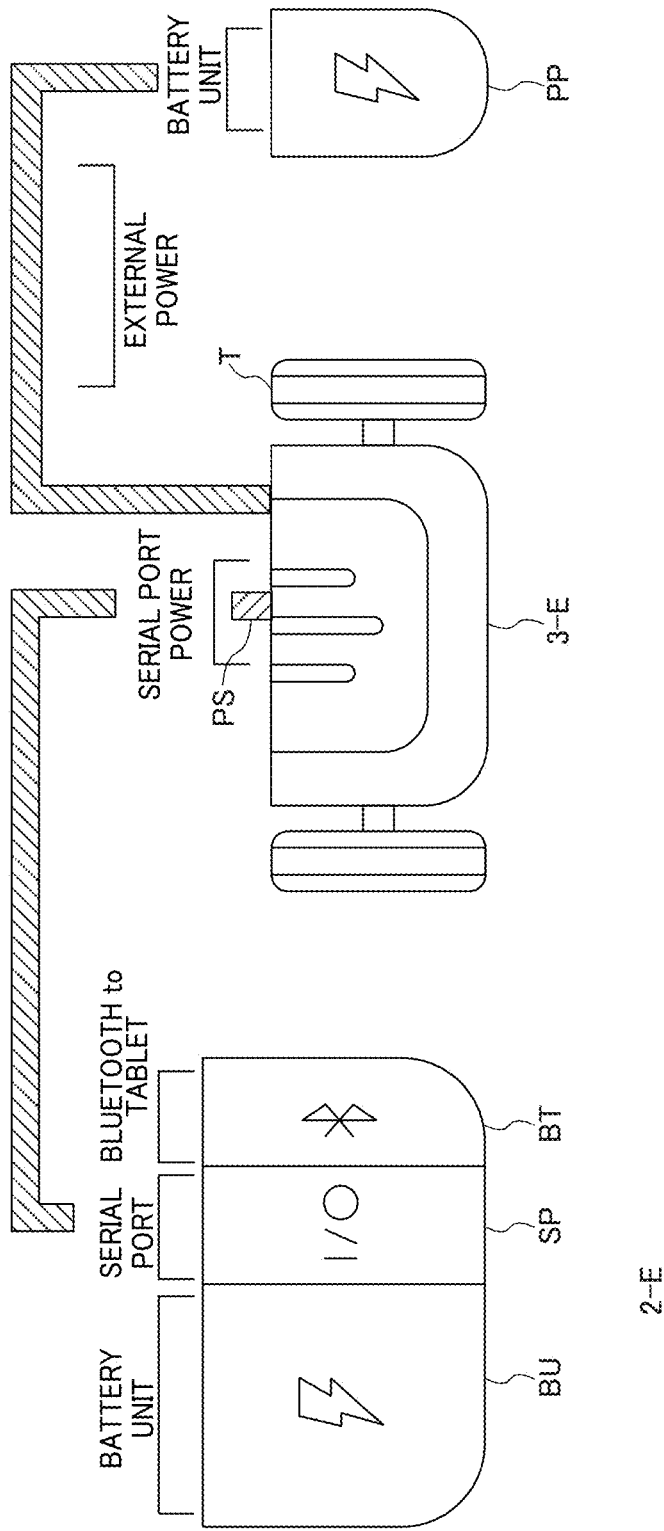
FIG. 5 is a diagram illustrating an example of a configuration of a state in which a basic core and a functional module according to an embodiment of the present invention are connected.

Next, a connection form of the basic core 2-E (E is an arbitrary integer value of 1 to m) and the functional module 3-E will be described in detail with reference FIG. 5. FIG. 5 is a diagram illustrating an example of a configuration of a state in which the basic core 2-E and the functional module 3-E according to an embodiment of the present invention are connected.

A basic core 2-E, a functional module 3-E, and a battery unit PP are illustrated in FIG. 5. The basic core 2-E includes a battery unit BU (for example, the power source unit 48 of FIG. 6 to be described later), a serial port SP, and a close-range communication unit BT (for example, the second close-range communication unit 46 of FIG. 6 to be described later). The battery unit BU is, for example, a battery such as a battery cell, and supplies electric power to the basic core 2-E and the functional module 3-E. The serial port SP is a connection port (a connection connector) for connecting the basic core 2-E to other hardware or the like. In the example of FIG. 5, the basic core 2-E includes a serial port SP, and the functional module 3-E includes a serial port PS. The basic core 2-E and the functional module 3-E are connected via the two serial ports SP and PS. The close-range communication unit BT is equipped with an IC card or the like for performing near field communication with other hardware or the like in accordance with a scheme conforming to a predetermined standard (for example, Bluetooth (registered trademark)). In the example of FIG. 5, the user terminal 1 (not illustrated in FIG. 5) and the basic core 2-E including the close-range communication unit BT perform the near field communication in accordance with the scheme conforming to Bluetooth (registered trademark). Specifically, for example, an execution result (command or the like) of the program produced on the user terminal 1 is also sent to the basic core 2-E. Further, in the basic core 2-E, an execution result (a command or the like) of the program transmitted from the user terminal 1 is acquired, and the result is transmitted to the functional module 3-E.

Also, the functional module 3-E is provided with a tire T (for example, functional hardware 68 in FIG. 4). Further, as described above, the functional module 3-E acquires the execution result (command or the like) of the program transmitted from the basic core 2-E. The functional module 3-E in the example of FIG. 5 drives a tire T in accordance with the execution result (command or the like) of the program produced by the user terminal 1. Here, in the example of FIG. 5, the battery unit PP is connected to the functional module 3-E. This battery unit PP supplies electric power to the functional module 3-E as external power source. As described above, if it is possible to supply electric power to the functional module 3-E from the power source unit 48 (FIG. 3) or the like of the basic core 2, the battery unit PP is not an essential component.

It is possible to execute a program production process through the cooperation of various types of hardware and various types of software of the user terminal 1, the basic core 2, and the functional module 3. Here, the program production process is a process for producing a program causing one or more functional modules 3 connected to the basic core 2 to function.

Figure 6:
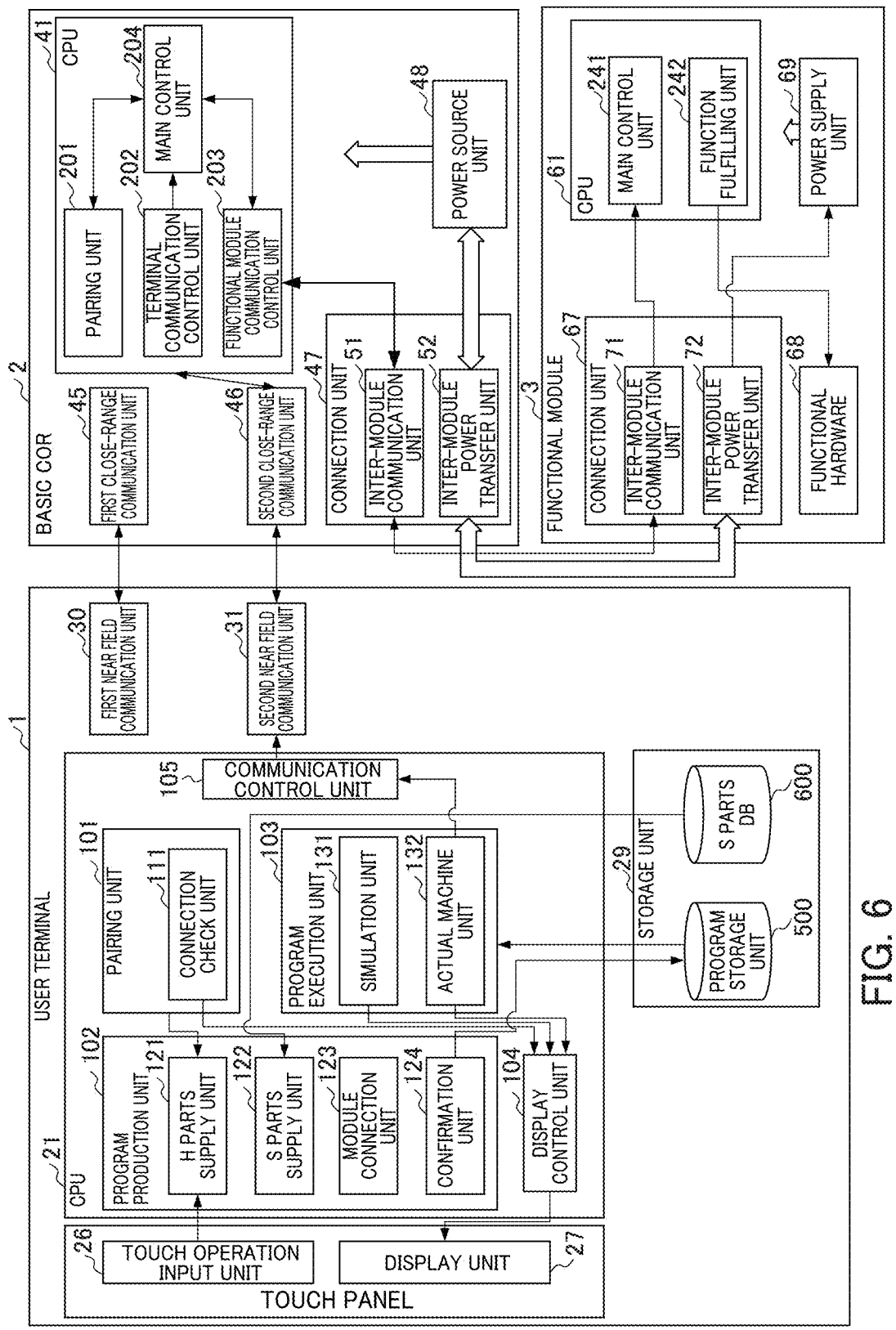
FIG. 6 is a functional block diagram illustrating an example of functional configurations of the user terminal of FIG. 2, the basic core of FIG. 3, and the functional module of FIG. 4.

In order to realize the program production process, the user terminal 1, the basic core 2, and the functional module 3 have functional configurations illustrated in FIG. 6. FIG. 6 is a functional block diagram illustrating an example of the functional configurations of the user terminal 1, the basic core 2, and the functional module 3 of FIG. 1. As illustrated in FIG. 6, a pairing unit 101, a program production unit 102, a program execution unit 103, a display control unit 104, and a communication control unit 105 function in the CPU 21 of the user terminal 1. Also, a program storage unit 500 that stores a program produced by the program production unit 102 and a software parts database (S parts DB) 600 that stores various types of S parts are disposed in an area of the storage unit 29 of the user terminal 1. Further, a pairing unit 201, a terminal communication control unit 202, a functional module communication control unit 203, and a main control unit 204 function in the CPU 41 of the basic core 2. A main control unit 241 and a function fulfilling unit 242 further function in the CPU 61 of the functional module 3.

The pairing unit 101 of the user terminal 1 performs pairing between the user terminal 1 and the basic core 2 through the first close-range communication unit 30. Although the pairing is performed by the near field communication conforming to the NFC (registered trademark) in the present embodiment, this is merely an example, and the pairing may be performed by communication of an arbitrary scheme. Further, a connection check unit 111 is disposed in the pairing unit 101. The connection check unit 111 checks types or connection states of the basic core 2 paired with the user terminal 1 and the functional module 3 connected thereto. The type and the connection state of the functional module 3 checked by the connection check unit 111 are displayed on the program production screen via the display control unit 104.

The program production unit 102 receives the touch operation of the user and actually produces the program. Here, an H parts supply unit 121, an S parts supply unit 122, a parts connection unit 123, and a confirmation unit 124 are disposed in the program production unit 102. The H parts supply unit 121 displays the H parts corresponding to the type of the functional module 3 connected to the basic core 2 with which the pairing is performed by the pairing unit 101 on the program production screen via the display control unit 104. The S parts supply unit 122 extracts the S parts from the S parts DB 600 appropriately, and displays the S parts on the program production screen via the display control unit 104. The parts connection unit 123 combines various types of H parts and various types of S parts in accordance with the touch operation of the user. In the finally produced program, the content of the program designated in various types of H parts and various types of S parts combined as described above are consecutively executed. The confirmation unit 124 confirms the content of the program produced by the user, and stores the produced program in the program storage unit 500.

The program execution unit 103 extracts a program which the user desires to execute among the programs stored in the program storage unit 500 and execute the extracted program. Here, a simulation unit 131 and an actual machine unit 132 are disposed in the program execution unit 103. The simulation unit 131 virtually executes the program extracted by the program execution unit 103 with no purpose of causing the basic core 2 and the functional module 3 to operate in accordance with the program produced by the user. That is, the simulation unit 131 performs a simulation to check whether or not the actually produced program can be executed normally. The execution result of the program is displayed on the display unit 27 via the display control unit 104 as described later. The actual machine unit 132 executes the program extracted by the program execution unit 103 with a purpose of causing the basic core 2 and the functional module 3 to operate in accordance with the program produced by the user. That is, the program execution unit 103 transmits the execution result (command or the like) of the produced program to the basic core 2 and the functional module 3 and causes the functional module 3 to fulfill its function. The execution result of the program is not only displayed on the display unit 27 via the display control unit 104 but also transmitted to the basic core 2 via the communication control unit 105 as described later.

The display control unit 104 executes control for displaying various types of information described above on the display unit 27.

The communication control unit 105 performs control or the like for transmitting the execution result of the program executed by the actual machine unit 132 of the program execution unit 103 to the basic core 2 via the second close-range communication unit 31. As described above, in the present embodiment, the second close-range communication unit 31 performs the near field communication in accordance with a scheme conforming to the Bluetooth (registered trademark) standard.

The pairing unit 201 of the basic core 2 performs pairing with the user terminal 1 through the first close-range communication unit 45. Here, the first close-range communication unit 45 is independent of the system in the basic core 2. Therefore, connection information (for example, the MAC address) of the second close-range communication unit 46 is written in the first close-range communication unit 45 in advance, and the pairing unit 201 reads the MAC address and performs pairing with the user terminal 1 by Bluetooth (registered trademark).

The terminal communication control unit 202 executes, for example, control for acquiring the execution result of the program transmitted from the user terminal 1 via the second close-range communication unit 46.

Here, when the program is executed, it is necessary for the functional module 3 that causes the program to fulfill its function through the program to be connected to a predetermined basic core 2. That is, at least when the program is executed, the basic core 2 and the functional module 3 are connected by the connection unit 47 and the connection unit 67. Here, at least when the program is executed, a connection between the basic core 2 and the functional module 3 can be performed independently of the pairing of the basic core 2 and the user terminal 1. That is, the connection between the basic core 2 and the functional module 3 may be performed before pairing, but the connection between the basic core 2 and the functional module 3 may be performed after pairing. In the latter case, the user terminal 1 recognizes what the functional module 3 is (what function it causes) by transmitting its own unique ID from the functional module 3 to the user terminal 1. Also, the functional module 3 can be removed from the basic core 2 after pairing. In this case, the basic core 2 gives a notification indicating that the functional module 3 has been removed to the user terminal 1. The user terminal 1 performs display indicating that the user terminal 1 has been removed on an UI (a user display screen of FIG. 8 to be described later). More accurately, in the present embodiment, when a predetermined functional module 3 is removed from the basic core 2, the user terminal 1 does not display an icon indicating the H parts corresponding to the predetermined functional module 3 in the UI. As described above, the hot swap of the functional module 3 after pairing is realized. That is, once pairing is performed, the user has only to attach/remove the functional module 3 to/from the basic core 2. The removed state is also followed by the UI on the user terminal 1. In any case, when the basic core 2 and the functional module 3 are connected, functional module communication control unit 203 of the basic core 2 controls communication with the functional module 3 connected via the connection unit 47. For example, the functional module communication control unit 203 transmits an operation instruction or the like output by the main control unit 204 to be described later to the functional module 3.

The main control unit 204 performs main control of various types of processes executed in the basic core 2. For example, the main control unit 204 outputs an operation instruction or the like to fulfill the function of the functional module 3 on the basis of the execution result of the program acquired by the terminal communication control unit 202.

The main control unit 241 of the functional module 3 performs main control of various types of processes executed in the functional module 3. For example, the operation instruction transmitted from the basic core 2 is acquired via the connection unit 67.

The function fulfilling unit 242 executes control for causing the functional hardware 68 to execute the operation instruction acquired by the main control unit 241. That is, the function fulfilling unit 242 causes the function of the functional module 3 to be fulfilled by causing the functional hardware 68 to execute the operation instruction acquired by the main control unit 241.

In FIG. 6, only the power supply unit 69 that supplies electric power acquired through the inter-module power transfer unit 72 to the functional module 3 is illustrated, but as described above, electric power supplied from an external power source (for example, the battery unit BU of FIG. 5) can also be supplied to the functional module 3.

Figure 7:
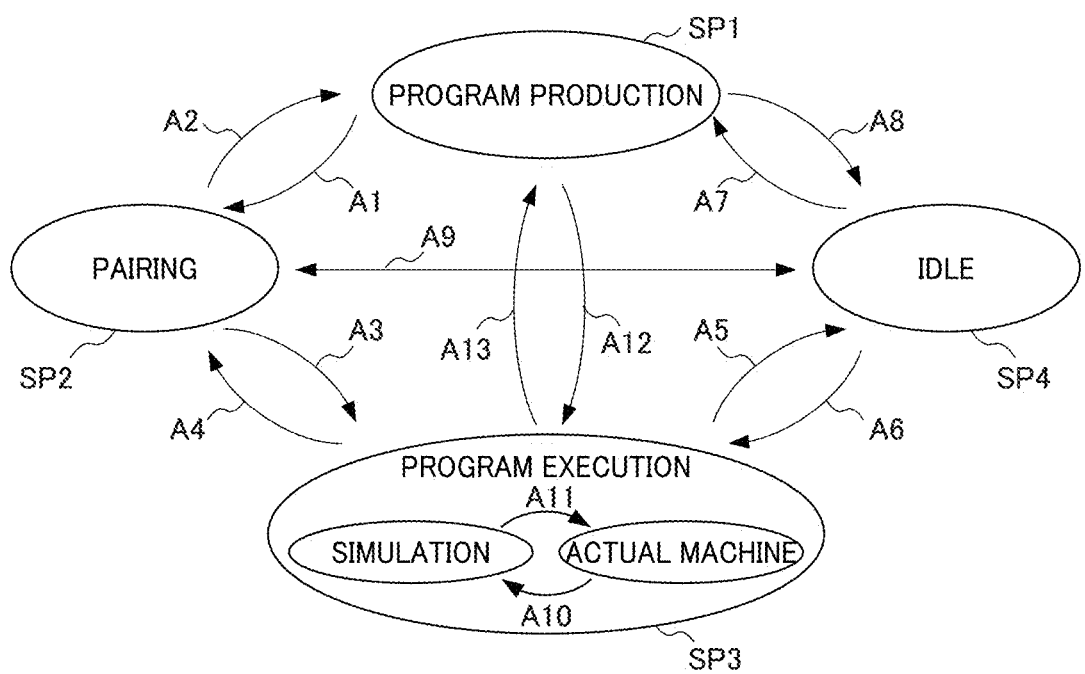
FIG. 7 is a state transition diagram illustrating a transition of a state in a program production process using an information processing system according to an embodiment of the present invention.

FIG. 7 is a state transition diagram illustrating a transition of a state in the program production process using the information processing system according to an embodiment of the present invention. In FIG. 7, each state is indicated by one oval, and each state is determined by a reference numeral including SP. A state transition from one state to one state is executed when a predetermined condition (hereinafter referred to as a "state transition condition") is satisfied. In FIG. 7, such a state transition condition is indicated by adding a reference numeral including A to an arrow indicating a transition from one state to one state.

In the present embodiment, as illustrated in FIG. 7, a program production state SP1 is a basic state. In the program production state SP1, the user performs pairing by bringing the user terminal 1 and the basic core 2 close to each other.

Here, "brought close" means bringing them close to each other up to a distance effective for performing the near field communication in accordance with the scheme conforming to the NFC (registered trademark) standard, generally, a distance of about 10 cm. That is, a state transition condition A1 is satisfied when the user brings the user terminal 1 and the basic core 2 close to each other up to a distance of about 10 cm. Then, the state transitions to a pairing state SP2. Thus, the H parts supply unit 121 displays the H parts on the program production screen via the display control unit 104. Then, after the pairing, when the user does not perform an operation for a certain period of time, a state transition condition A2 is satisfied. Thus, the state transitions to the program production state SP1 again.

In the pairing state SP2, when the user presses a predetermined operator (a program execution button or the like (not illustrated)) down, a state transition condition A3 is satisfied. Then, the state transitions to a program execution state SP3. Then, similarly to the previous case, in the program execution state SP3, the user brings the user terminal 1 and the basic core 2 close to each other, so that a state transition condition A4 is satisfied. Then, the state transitions back to the pairing state SP2.

In the program production state SP1, when the user finishes the production of the program and presses a predetermined operator (program execution button not illustrated) for instructing execution of the program down, a state transition condition A12 is satisfied. Then, the state transitions to the program execution state SP3. In program execution state SP3, when the user desires to add or change a program, if the user presses a predetermined operator (the program production button (not illustrated) or the like) down, a state transition condition A13 is satisfied. Then, the state transitions to the program execution state SP1.

Here, in the program execution state SP3, there are two states: a simulation state; and an actual machine state as described above. In the program execution state SP3, a state transition condition A10 or A11 in each state is satisfied when the user presses a predetermined operator (a simulation button (not illustrated) or the like) down. As described above, in the program execution state SP3, the simulation state and the actual machine state can transition appropriately.

In the program execution state SP3, when the user presses a predetermined operator (a program execution cancel button (not illustrated) or the like) down after the program is executed, a state transition condition A5 is satisfied. Then, the state transitions to an idle state SP4. Then, in the idle state SP4, when the user presses a predetermined operator (the program execution button (not illustrated) or the like) down, a state transition condition A6 is satisfied. Then, the state transitions to the program execution state SP3.

In the idle state SP4, when the user presses a predetermined operator (an activation button of a program creation application (not illustrated) or the like) down, a state transition condition A7 is satisfied. Then, the state transitions to the program production state SP1. Then, in the program production state SP1, when the user presses a predetermined operator (a program production cancel button (not illustrated) or the like) down, a transition condition A8 is satisfied. Then, the state transitions to the idle state SP4. As illustrated in FIG. 7, direct transition to the pairing state SP2 and the idle state SP4 is also possible.

Figure 8:
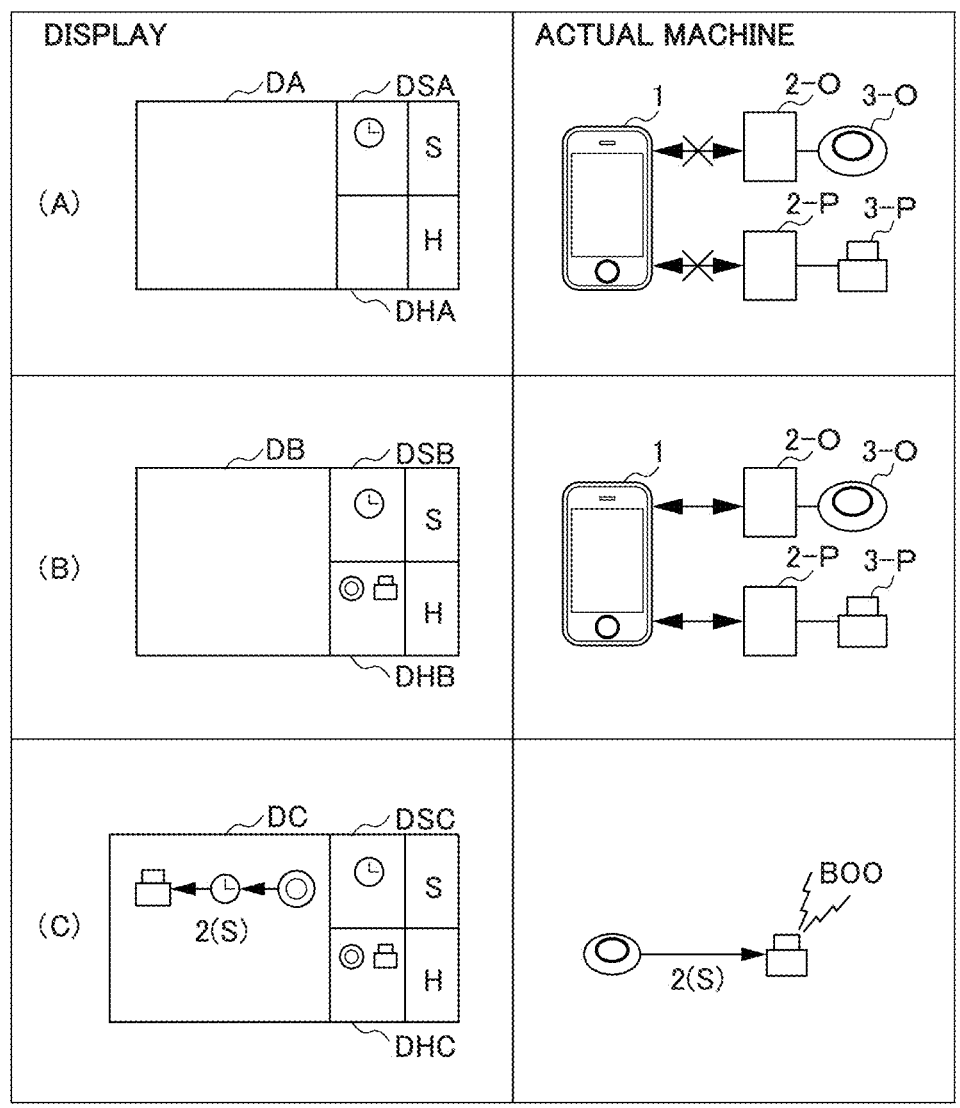
FIG. 8 is a diagram illustrating an example of a screen actually displayed on a user in a program production process using an information processing system according to an embodiment of the present invention.

Next, the program production screen displayed on the display unit 27 of the user terminal 1 will be described in detail with reference to FIG. 8 and FIG. 9. FIG. 8 is a diagram illustrating an example of the screen actually displayed for the user in the program production process executed by the user terminal 1 of FIG. 2.

In FIG. 8, the program production screens displayed for the user (hereinafter referred to as a "user display screen") are illustrated in the left half portion, and schematic diagrams of various types of hardware operating in accordance with an actually produced program (hereinafter, referred to as a "hardware schematic diagram") are illustrated in the right half portion. First, a part (A) of FIG. 8 illustrates a situation in which the user terminal 1 is not paired with any basic core 2. That is, referring to the hardware schematic diagram of the part (A) of FIG. 8, both the basic core 2-O and the functional module 3-O (O is any integer value of 1 to m) and the basic core 2-P and the functional module 3-P (P is an integer value other than O among 1 to m) are not paired with the user terminal 1. The functional module 3-O can fulfill a function of a push button. The functional module 3-P can fulfill a function of a buzzer. Further, referring to the user display screen of the part (A) of FIG. 8, no icon is displayed in a program production display area DA and an H parts display area DHA. Further, an icon of a timer is displayed in the S parts display area DSA.

A part (B) of FIG. 8 illustrates a situation in which the user terminal 1 is paired with the basic core 2-O to which the functional module 3-O is connected, and the user terminal 1 is paired with the basic core 2-P to which the functional module 3-P is connected. Further, referring to the user display screen of the part (B) of FIG. 8, the icon of the push button corresponding to the paired functional module 3-O and the icon of the buzzer corresponding to the functional module 3-P are displayed in the H parts display area DHB.

A part (C) of FIG. 8 illustrates a situation in which the program produced by user is executed. Referring to the user display screen of the part (C) in FIG. 8, the icon of the push button, the icon of the timer (2s), and the icon of the buzzer are displayed in the program production display area DC in order from the right, and the respective icons are connected. As described above, the user can produce one program by freely combining and connecting various types of H parts and various types of S parts and combining content designated by the respective icons while visually recognizing the icons displayed on the user display screen, the user can execute the program. Referring to the hardware schematic of the part (C) of FIG. 8, it is understood that, as a result of executing the program displayed on the user display screen of FIG. 8, if the push button (the functional module 3-O) is pressed down, an operation of sounding a buzzer (the functional module 3-P) is realized after two seconds.

Figure 9:
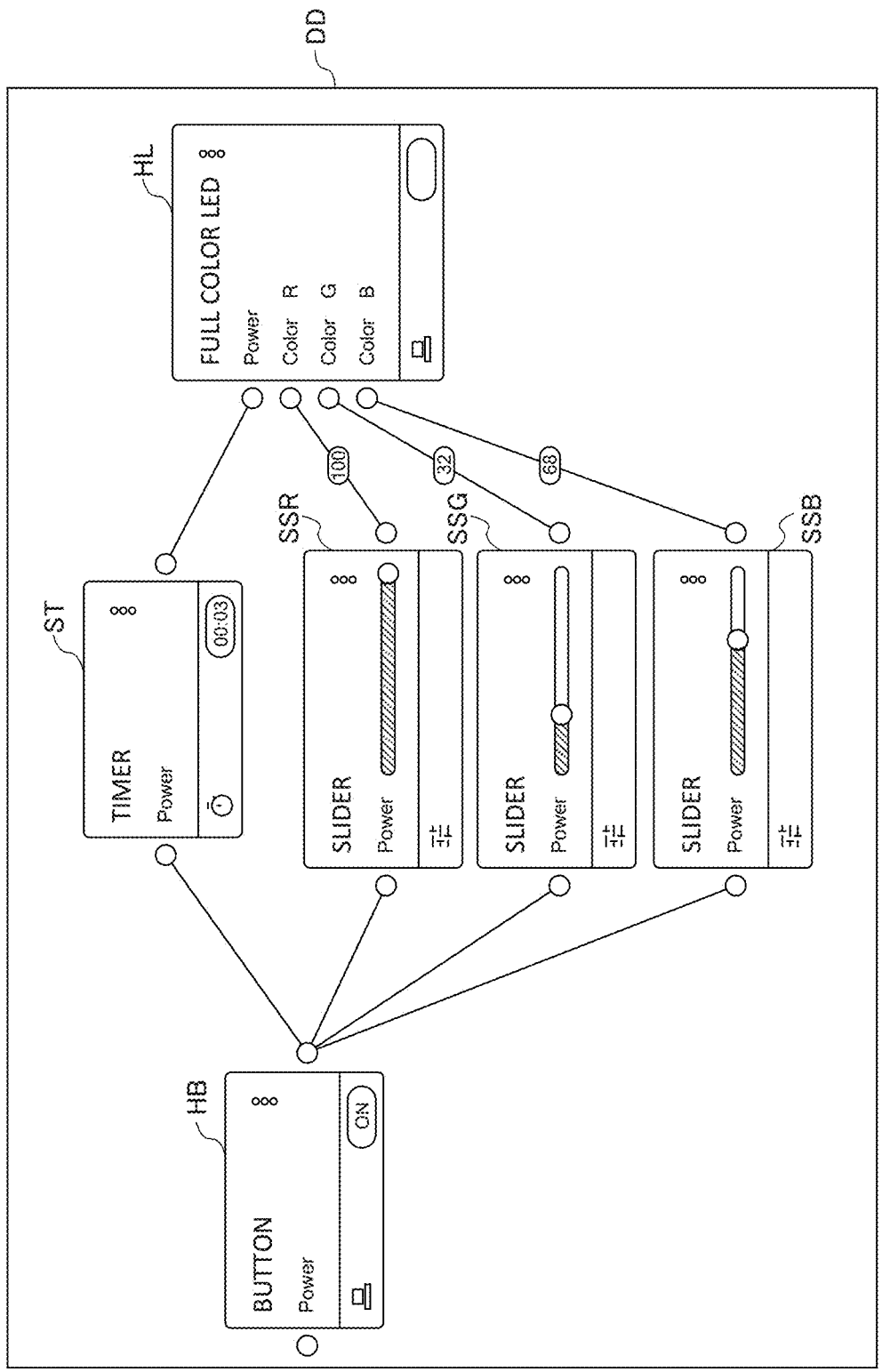
FIG. 9 is a diagram illustrating an example of a screen which is actually displayed on a user in a program production process using an information processing system according to an embodiment of the present invention and is different from FIG. 8.

FIG. 9 is a diagram illustrating an example of the screen which is actually displayed for the user in the program production process executed by the user terminal 1 of FIG. 2 and is different from the example of FIG. 8.

In FIG. 9, only the program production screen displayed for the user, that is, the user display screen is illustrated. Referring to the user display screen of FIG. 9, in the program production display area DD, an icon HB of a button is displayed on the left as the H parts, and an icon HL of a full color LED is displayed on the right as the H parts. An icon ST of the timer and icons SSR, SSG, and SSB of the slider are displayed between them as S parts. In each of the icon ST of the timer and the icons SSR, SSG, and SSB of the slider, the icon HB is connected to an input side, and the icon HL is connected to an output side. Here, the icon ST of the timer is an S parts which outputs trigger information when a set time elapses. In other words, the icon ST of the timer is an S parts which outputs a digital signal of 0 or 1. On the other hand, the icons SSR, SSG, and SSB of the slider are S parts that can output any numerical value between 0 and 255. In other words, the icons SSR, SSG, and SSB of the slider are S parts that output analog signals. As described above, the S parts can handle various types of information such as analog signal as input/output information. If a corresponding functional module 3 can input or output various types of information such as analog signals, the H parts can also handle various types of information such as analog signal as input/output information in association with it. In the example of FIG. 9, if the program displayed on the user display screen is executed, and then the push button (the functional module (not illustrated)) is pressed down, output values of the icons SSR, SSG, and SSB of the slider are transferred to the LED (the functional module (not illustrated)) as an R value, a G value, and a B value after a predetermined period elapses, and thus an operation of turning on the LED in full colors specified by the R value, the G value, and the B value is realized.

Although one embodiment of the present invention has been described above, the present invention is not limited to the above-described embodiment, and modifications, improvements, and the like within a scope which can achieve the object of the present invention are included in the present invention.

For example, in the embodiment illustrated in FIG. 8, the push button and the buzzer are employed as the functional module 3-O and the functional module 3-P, but the function fulfilled by the functional module 3 is not particularly limited to the embodiment described above. Hereinafter, several other embodiments in which a method different from that in the above-described embodiment is employed will be described with reference to FIG. 10A and FIG. 10B.

Figure 10B:
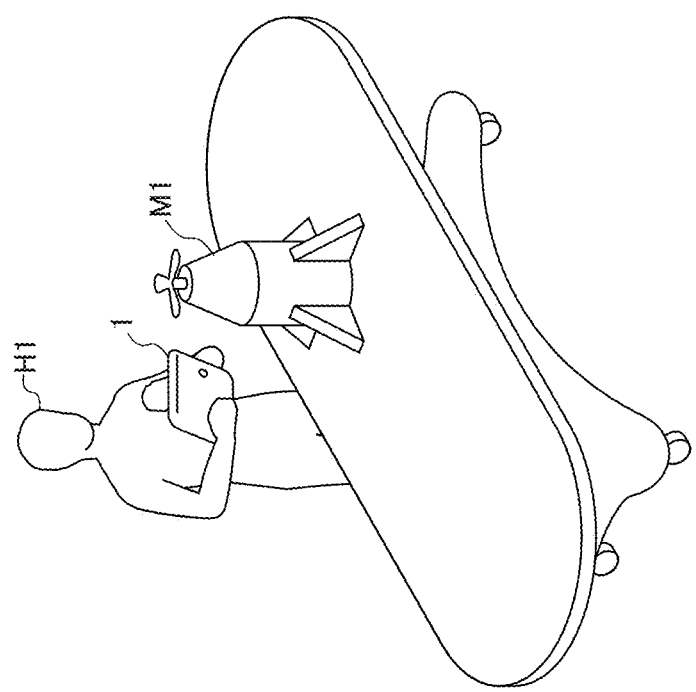
FIG. 10A and FIG. 10B are diagrams illustrating specific examples according to an embodiment of the present invention.
Figure 10A:
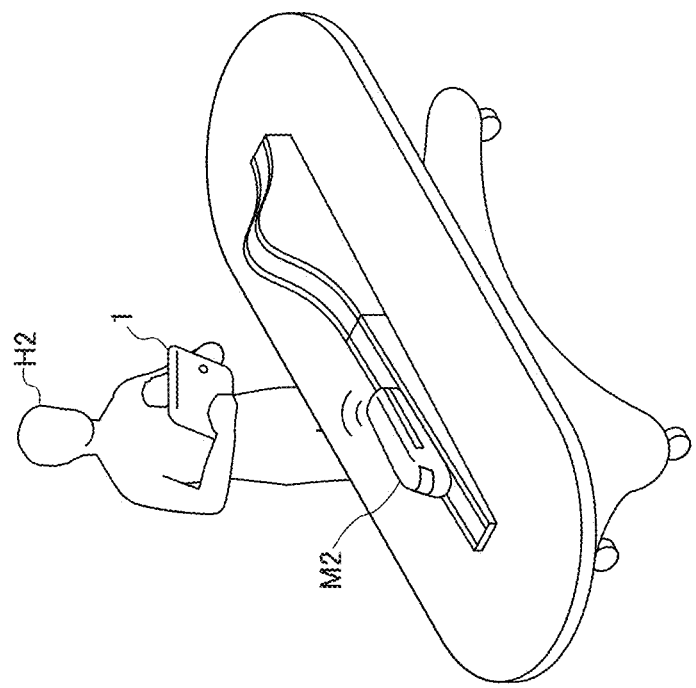

FIG. 10A and FIG. 10B illustrate specific examples according to an embodiment of the present invention which is different from those of FIG. 5 and FIG. 8. As illustrated in FIG. 10A, a rocket toy with a propeller is employed as a functional module M1. For example, in the example of FIG. 10A, when a program execution button is pressed down by a predetermined user H1, a program in which the propeller rotates after a countdown of 10 seconds is produced and executed. A basic core B1 connected to the functional module M1 or a functional module MC (for example, a speaker or the like) that fulfills the countdown function is not illustrated but is stored, for example, in the functional module M1.

Also, as illustrated in FIG. 10B, a train toy is employed as the functional module M1. For example, in the example of FIG. 10B, when the program execution button is pressed down by a predetermined user H2, a program in which a train departs in response to a human voice or the like is produced and executed. In FIG. 10B, similarly to FIG. 10A, a basic core B2 connected to a functional module M2 or a functional module MA (for example, a voice sensor) that fulfills a function of capturing a sound is not illustrated but, for example, is stored in the functional module M2. Although the present invention can be implemented by such various embodiments, it is extremely useful in many embodiments, particularly in producing a program for use in a children education assembly toy. Since the icons displayed on the program production screen can be visually checked, it is possible to safely and easily produce the program even if the user is a child, and it is also possible to cause an actual machine to operate in accordance with the program produced by the user, and thus the children can enjoy producing programs without getting bored. As described above, since the children can produce the program while having fun, the children can become familiar with the program which is generally difficult to touch. Further, if the basic core 2 and the user terminal 1 not illustrated in FIG. 10 are paired, the functional module 3 such as the functional modules M1 and M2 can be freely attached and detached, and the attachment/removal state is also reflected in the program production screen. Accordingly, the children can also enjoy hardware design.

Here, the input/output information in the present embodiment will be described supplementarily. In the present embodiment, as various types of H parts or various types of S parts are combined, the content of the program designated in various types of icons are continuously executed. For the input/output information of each program, not only as simple trigger information illustrated in FIG. 8 but also as various types of information such as analog signals illustrated in FIG. 9 can be handled as the input/output information. That is, for example, for the input/output information in the present embodiment, information (for example, a temperature is 15 degrees) acquired by a temperature sensor can be output as information such as an analog signal without change and used for program production. Therefore, it is possible to realize even a complicated information process that is unable to be realized only with digital signal information.

Figure 11:
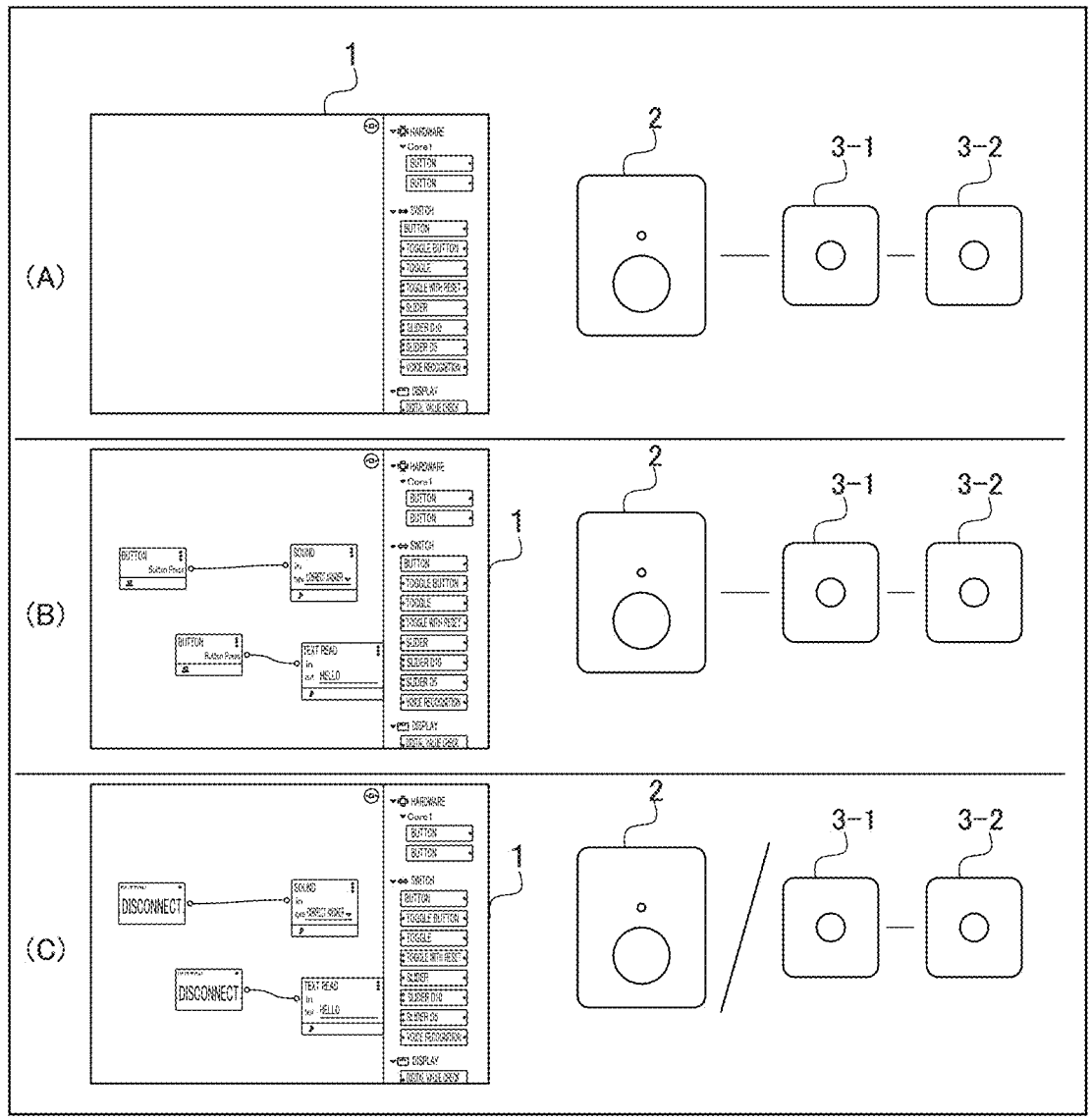
FIG. 11 is a diagram illustrating an example of a screen actually displayed on the user terminal of FIG. 2 in a connection state recognition process executed by an information processing system according to an embodiment of the present invention.

Next, a connection recognition process will be described. The connection recognition process is a series of processes in which the user terminal 1 recognizes the functional module 3 connected to the basic core 2 paired with the user terminal 1 and causes the user terminal 1 to display each connection state of the functional module 3. FIG. 11 is a diagram illustrating an example of the screen actually displayed on the user terminal 1 of FIG. 2 in the connection state recognition process performed by the information processing system according to an embodiment of the present invention. In FIG. 11, similarly to FIG. 8, the user display screens (the program production screen displayed for the user) are illustrated on the left half portion, and the hardware diagrams (schematic diagrams of various types of hardware operating in accordance with the actually produced program) are illustrated on the right half portion. The illustrations of the user display screen and the hardware schematic diagram are similarly applied to FIG. 12 and FIG. 13 to be described later.

According to the hardware schematic diagram, a part (A) of FIG. 11 illustrates a situation in which the user terminal 1 is paired with the basic core 2 to which functional modules 3-1 and 3-2 are connected. Here, each of the functional modules 3-1 and 3-2 can fulfill the function of the button. Icons (icons displayed as a button) of the functional modules 3-1 and 3-2 connected to the paired basic core 2 are displayed in the H parts display area of the user display screen of the part (A) of FIG. 11. In the state of the part (A) of FIG. 11, since the program production by the user has not been performed yet, nothing is displayed in the program production display area of the user display screen.

According to the hardware schematic diagram, similarly to the part (A) of FIG. 11, a part (B) of FIG. 11 illustrates a situation in which the user terminal 1 is paired with the basic core 2 to which the functional modules 3-1 and 3-2 are connected. The icons (the icons displayed as the button) of the functional modules 3-1 and 3-2 connected to the paired basic core 2 are displayed in the H parts display area of the user display screen of the part (B) of FIG. 11. In the state of the part (B) of FIG. 11, the program production by the user is performed, and in the program production display area of the user display screen, an icon "sound correct answer" is connected to an output side of the icon of the button corresponding to the functional module 3-1, and an icon "text read hello" is connected to the output side of the icon of the button corresponding to the functional module 3-2. In the state of the part (B) of FIG. 11, if the program produced by the user is executed, when the button of the functional module 3-1 is pressed down, "correct answer" is actually output as a sound, and when the button of the functional module 3-2 is pressed down, a text "hello" is read out.

According to the hardware schematic diagram, a part (C) of FIG. 11 illustrates a situation in which the basic core 2 paired with the user terminal 1 is disconnected from the functional modules 3-1 and 3-2 due to some reason after the state of the part (B) of FIG. 11. In the state of the part (C) of FIG. 11, in the program production display area of the user display screen, the icon of the button corresponding to the functional module 3-1 is erased, and an icon indicating "disconnect" is displayed at the same position. Similarly, the icon of the button corresponding to the functional module 3-2 is erased, and an icon indicating "disconnect" is displayed at the same position.

Figure 12:
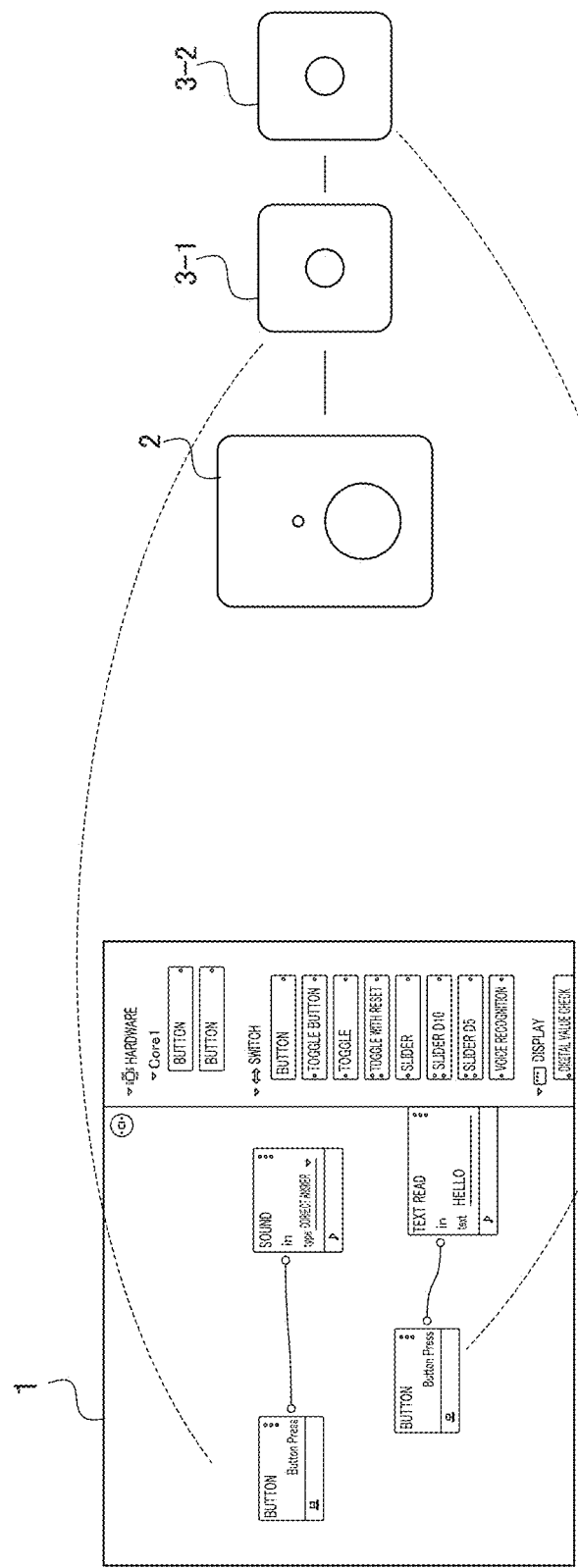
FIG. 12 is a diagram illustrating an example of a screen actually displayed on the user terminal of FIG. 2 in a reconnection association process executed by an information processing system according to an embodiment of the present invention.

Next, a reconnection association process will be described. The reconnection association process is a series of processes in which the user terminal 1 recognizes the functional module 3 which is reconnected after disconnected from the basic core 2 paired with the user terminal 1, and each connection state of the functional module 3 is recovered and displayed on the user terminal 1. FIG. 12 is a diagram illustrating an example of the screen actually displayed on the user terminal of FIG. 2 in the reconnection association process executed by the information processing system according to an embodiment of the present invention.

If the reconnection association process is performed, as illustrated in FIG. 12, in the program production display area of the user display screen, two icons indicating "disconnect" displayed in the disconnected state (the state of the part (C) of FIG. 11) are erased, and the displays of the icons of the two buttons corresponding to the functional modules 3-1 and 3-2 are recovered at each same position.

Here, when there are two or more functional modules 3 of the same type (such as the button) in which the connection state is recovered (for example, in the example of FIG. 12, there are two functional modules 3-1 and 3-2 of the button), there is a problem in that there are a plurality of combinations about hardware parts to be associated. In this respect, for example, when the functional module 3 (hardware part) and a software part are associated in the program, the user terminal 1 may cause a uniquely identifiable code to be stored for the functional module 3 (hardware part), and when the connection state of the functional module 3 is recovered, the association with the software part may be recovered automatically on the basis of the code.

Figure 13:
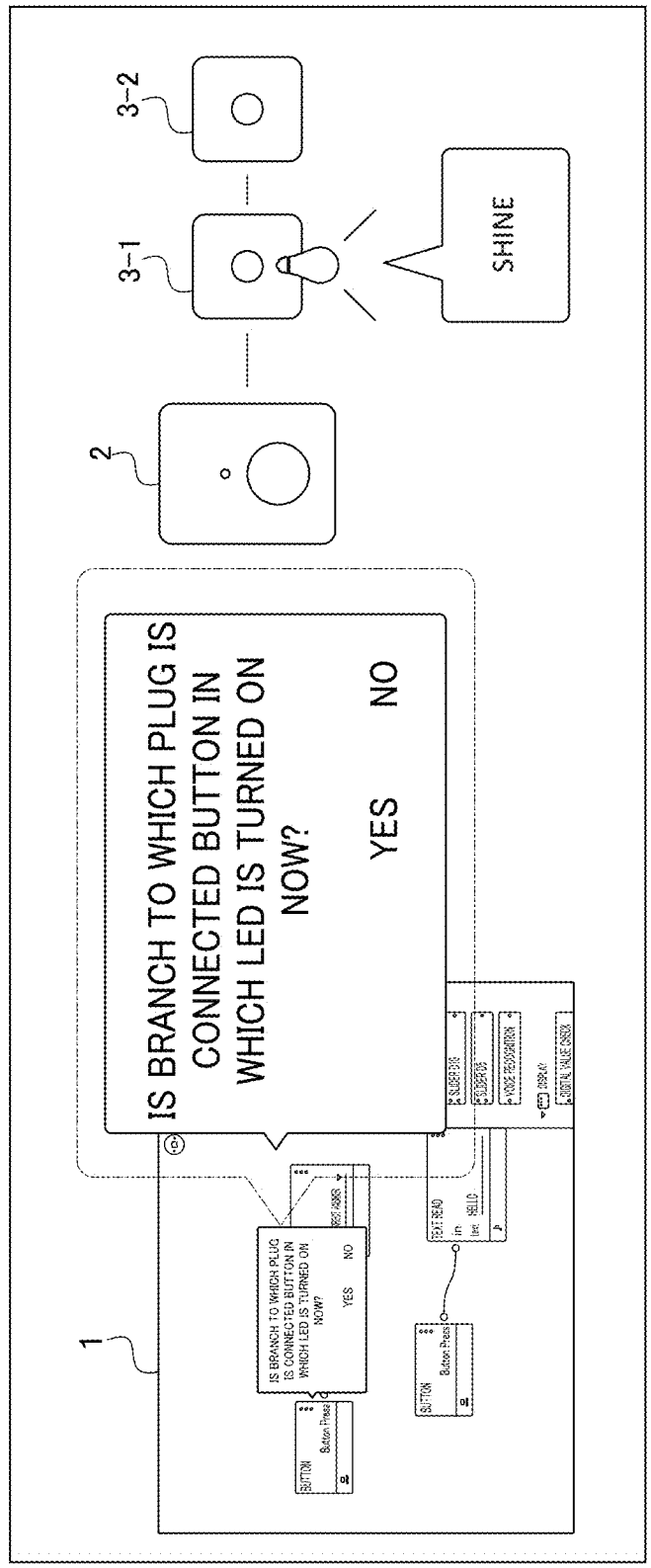
FIG. 13 is a diagram illustrating an example of a screen actually displayed on the user terminal of FIG. 2 in a process of an example different from FIG. 12 of a reconnection association process executed by an information processing system according to an embodiment of the present invention.

FIG. 13 illustrates an example of the screen actually displayed on the user terminal of FIG. 2 in a process of an example different from FIG. 12 of the reconnection association process executed by the information processing system according to an embodiment of the present invention. In the connection association process of the example of FIG. 13, the functional modules 3-1 and 3-2 which are reconnected after disconnected from the basic core 2 paired with the user terminal 1 are recognized by the user terminal 1, and the user is caused to recognize the recovery when the each connection state of the functional modules 3-1 and 3-2 is recovered. That is, according to the hardware schematic diagram of FIG. 13, when there are a plurality of functional modules 3 in which the connection state is recovered (in the example of FIG. 13, when there are two functional modules 3-1 and 3-2), the LED of the functional module 3 (the functional module 3-1 in the example of FIG. 13) which is a target whose recovery has to be recognized by the user is turned on. Accordingly, the user can recognize the target with high degree of certainty. Then, in the program production display area of the user display screen, a confirmation dialog is displayed to be close to the icon of the button corresponding to the target functional module 3 (the functional module 3-1 in the example of FIG. 13). In the confirmation dialog, for example, a message "Is branch to which plug is connected button whose LED is turned on now? Yes No" is displayed. The user can select "Yes" or "No" in the user terminal 1. When the selection operation of "Yes" is performed, the connection (association) of the icon "sound correct answer" to the output side of the icon of the button corresponding to the functional module 3-1 is recovered. Further, for the recovery of the connection on the side of the functional module 3-2, similarly, the confirmation dialogue may be displayed to be close to the icon of the button corresponding to the functional module 3-2 while displaying the LED of the functional module 3-2. Alternatively, the connection of the functional module 3-2 may be automatically recovered at the same time as when the connection of the functional module 3-1 is recovered.

Further, the examples illustrated in FIG. 11 to FIG. 13 are merely examples. That is, in an information processing system including a control device (a user terminal 1), one or more first hardware devices (basic cores 2) having a function of pairing with the control device (the user terminal 1) through near field communication and a function of communicating with another hardware device, and two or more second hardware devices (functional modules 3) having a function of communicating with the first hardware devices (the basic core 2) and a function of fulfilling a predetermined function, the control device (the user terminal 1) and the first hardware device (the basic core 2) can execute a control process including the following steps. That is, the information processing system can execute a control process including:

a process-association step of associating a predetermined series of processes of combining and executing the two or more second hardware devices (the functional modules 3) communicating with the first hardware device (the basic core 2) paired with the control device (the user terminal 1) for each second hardware device (functional module 3);

a communication state detection step of detecting that a communication state between the two or more second hardware devices (the functional modules 3) with which the predetermined series of processes is associated in the process-association step and the one or more first hardware devices (the basic core 2) is disconnected; and an association checking step of checking an associated second hardware device out of the two or more second hardware devices (the functional modules 3) for each associated process when the communication state with the one or more first hardware devices (the basic core 2) and the two or more second hardware devices (the functional modules 3) in which it is detected that the connection state with the one or more first hardware devices (the basic core 2) is disconnected in the communication state detection step is recovered.

Further, for example, in the above-described embodiment, the pairing between the user terminal 1 and the basic core 2 is performed by the near field communication in accordance with a scheme conforming to the NFC (registered trademark) standard, but the present invention is not limited thereto. The pairing may be performed by any means which is not limited to the near field communication. Further, in the above-described embodiment, the execution result of the program produced in the user terminal 1 is transmitted using the near field communication in accordance with a scheme conforming to the standard such as Bluetooth (registered trademark), but the present invention is not particularly limited thereto. The produced program may be transmitted using any means which is not limited to the near field communication.

Further, for example, in the above present embodiment, although the number of basic cores 2 and the number of functional modules 3 are both described as being m, the present invention is not particularly limited thereto. That is, the number of basic cores 2 and the number of functional modules 3 may be the same or different. That is, s (s is an arbitrary integer value of 1 or more) functional modules 3 may be connected to a single basic core 2.

Further, for example, the series of processes described above can be executed by hardware or software. In other words, the functional configuration of FIG. 6 is merely an example and is not particularly limited. That is, it is sufficient if the information processing system has a function capable of executing the series of processes described above as a whole, and the functional block used to realize the function is not particularly limited to the example of FIG. 4. Further, the locations of the functional blocks are not particularly limited to those in FIG. 6 and may be arbitrary. Further, one functional block may be configured by hardware alone, may be configured by software alone, or may be configured by a combination of them.

Further, for example, when a series of processes is executed by software, a program that configures the software is installed in a computer or the like from a network or a recording medium. The computer may be a computer incorporated into dedicated hardware. Further, the computer may be a computer capable of executing various types of functions by installing various types of programs, for example, a general-purpose smartphone or a personal computer in addition to a server.

Further, for example, a recording medium including such a program is not only configured by a removable medium (not illustrated) which is distributed separately from a device main body to provide the program to the user but also configured by a recording medium or the like provided to the user in a state in which it is incorporated into the device main body in advance.

In this specification, steps of describing the program recorded in the recording medium are not limited to processes which are performed chronologically in accordance with the order but include processes which are not necessarily chronologically executed but executed in parallel or individually. Further, in this specification, a term "system" refers to the entire device constituted by a plurality of devices, a plurality of means, or the like.

In other words, the information processing system to which the present invention is applied can have various forms of embodiment having the following configuration. That is, the information processing device to which the present invention is applied is preferably a control device in an information processing system including the control device, one or more first hardware devices having a function of pairing with the control device through near field communication and a function of communicating with another hardware device, and one or more second hardware devices having a function of communicating with the first hardware devices and a function of fulfilling a predetermined function, the control device including:

a control execution means (for example, the program execution unit 103 in FIG. 6) that executes control of combining a plurality of sets of the first hardware device and the second hardware device and causing a predetermined series of processes to be executed;

a pairing execution means (for example, the pairing unit 101 in FIG. 6) that executes pairing between the first hardware device serving as a control target of the control execution means and the control device in accordance with near field communication of a predetermined scheme; and a presentation means (for example, the connection check unit 111 in FIG. 6) that presents a state of the pairing between the first hardware device serving as the control target of the control execution means and the control device. Accordingly, the user can produce the program by easy operations (an operation of combining and associating icons or the like) while checking the content of the program to be produced visually.

EXPLANATION OF REFERENCE NUMERALS

1 . . . USER TERMINAL, 2 . . . BASIC CORE, 3 . . . FUNCTIONAL MODULE, 21 . . . CPU, 27 . . . DISPLAY UNIT, 30 . . . FIRST CLOSE-RANGE COMMUNICATION UNIT, 31 . . . SECOND CLOSE-RANGE COMMUNICATION UNIT, 41 . . . CPU, 45 . . . FIRST CLOSE-RANGE COMMUNICATION UNIT, 46 . . . SECOND CLOSE-RANGE COMMUNICATION UNIT, 47 . . . CONNECTION UNIT, 48 . . . POWER SOURCE UNIT, 51 . . . INTER-MODULE COMMUNICATION UNIT, 52 . . . INTER-MODULE POWER TRANSFER UNIT, 61 . . . CPU, 67 . . . CONNECTION UNIT, 68 . . . FUNCTIONAL HARDWARE, 69 . . . POWER SUPPLY UNIT, 71 . . . INTER-MODULE COMMUNICATION UNIT, 72 . . . INTER-MODULE POWER TRANSFER UNIT, 101 . . . PAIRING UNIT, 102 . . . PROGRAM PRODUCTION UNIT, 103 . . . PROGRAM EXECUTION UNIT, 104 . . . DISPLAY CONTROL UNIT, 105 . . . COMMUNICATION CONTROL UNIT, 111 . . . CONNECTION CHECK UNIT, 121 . . . H PARTS SUPPLY UNIT, 122 . . . S PARTS SUPPLY UNIT, 123 . . . PARTS CONNECTION UNIT, 124 . . . CONFIRMATION UNIT, 131 . . . SIMULATION UNIT, 132 . . . ACTUAL MACHINE UNIT, 201 . . . PAIRING UNIT, 202 . . . TERMINAL COMMUNICATION CONTROL UNIT, 203 . . . FUNCTIONAL MODULE COMMUNICATION CONTROL UNIT, 204 . . . MAIN CONTROL UNIT, 241 . . . MAIN CONTROL UNIT, 242 . . . FUNCTION FULFILLING UNIT, 500 . . . PROGRAM STORAGE UNIT, 600 . . . S PARTS DB

The invention claimed is:

1. A control device in an information processing system including the control device, a plurality of first hardware devices having a function of pairing with the control device through near field communication and a function of communicating with another hardware device, and a plurality of second hardware devices having a function of communicating with the first hardware devices and a function of fulfilling a predetermined function, the control device comprising:
a storage unit that stores a program for creating a program related to a predetermined function, and
a processor coupled to the storage unit, wherein the processor is configured to:
execute control of combining of the first hardware devices and the second hardware devices and causing a predetermined series of processes to be executed;
execute pairing between one of the first hardware devices serving as a control target of predetermined series of processes to be executed and the control device, in accordance with a first near field communication of a predetermined scheme;
present a state of the pairing between one of the first hardware devices serving as the control target and the control device, or along with the state of the pairing, a type and connection status of one or more of the second hardware devices connected to one of the first hardware devices;
transmit an execution result of a program to one of the first hardware devices by a second near field communication of a predetermined scheme, the program created to function one of the first hardware devices serving as the control target and one or more of the second hardware devices connected to the one of the first hardware devices; and
confirm the content of the created program, based on the execution result of the program and store the program in the storage unit.

2. The control device according to claim 1, wherein the processor is configured to
virtually execute the predetermined series of processes in the control device and
actually execute the predetermined series of processes while communicating with the first hardware device serving as the control target.

3. The control device according to claim 1, wherein the processor is configured:
receive an operation to combine two or more parts from among a plurality of parts including a hardware part indicating a set of the first hardware device and the second hardware device and a software part causing a predetermined function to be fulfilled in the control device in order to cause the predetermined series of processes to be executed;
confirm a combination of the two or more parts; and
execute control of causing the predetermined series of processes to be executed on the basis of the combination of the two or more parts confirmed by the confirmation unit.

4. The control device according to claim 3, wherein the plurality of parts include one or more parts that input or output an analog signal.

5. A control method executed by a control device in an information processing system including the control device, a plurality of first hardware devices having a function of pairing with the control device through near field communication and a function of communicating with another hardware device, and a plurality of second hardware devices having a function of communicating with the first hardware devices and a function of fulfilling a predetermined function, the control method comprising:
executing, by a control processor in the control device, control of combining of the first hardware devices and the second hardware devices and causing a predetermined series of processes to be executed;
executing, by the control processor, pairing between the first hardware device serving as a control target for the predetermined series of processes to be executed and the control device, in accordance with a first near field communication of a predetermined scheme;
presenting, by the control processor, a state of the pairing between one of the first hardware devices serving as the control target and the control device, or along with the state of the pairing, a type and connection status of one or more of the second hardware devices connected to one of the first hardware devices;

transmitting, by the control processor, an execution result of a program to one of the first hardware devices by a second near field communication of a predetermined scheme, the program created to function one of the first hardware devices serving as the control target and one or more of the second hardware devices connected to the one of the first hardware devices; and confirming, by the control processor, the content of the created program, based on the execution result of the program and storing, by the control processor, the program in the storage unit.

6. A non-transitory computer readable medium storing a program for causing a computer to execute a control processing, the computer controlling a control device in an information processing system including the control device, a plurality of first hardware devices having a function of pairing with the control device through near field communication and a function of communicating with another hardware device, and a plurality of second hardware devices having a function of communicating with the first hardware devices and a function of fulfilling a predetermined function, the program comprising functionality for:

executing control of combining of the first hardware devices and the second hardware devices and causing a predetermined series of processes to be executed;

executing pairing between one of the first hardware devices serving as a control target for the predetermined series of processes to be executed and the control device, in accordance with a first near field communication of a predetermined scheme;

presenting a state of the pairing between one of the first hardware devices serving as the control target and the control device, or along with the state of the pairing, a type and connection status of one or more of the second hardware devices connected to one of the first hardware devices;

transmitting an execution result of a program to one of the first hardware devices by a second near field communication of a predetermined scheme, the program created to function one of the first hardware devices serving as the control target and one or more of the second hardware devices connected to the one of the first hardware devices; and confirming the content of the created program, based on the execution result of the program and storing the program in the storage unit.

7. An information processing device functioning as a first hardware device in an information processing system including a control device, a plurality of first hardware devices having a function of pairing with the control device through near field communication and a function of communicating with another hardware device, and a plurality of second hardware devices having a function of communicating with the first hardware devices and a function of fulfilling a predetermined function, the information processing device comprising:

a processor coupled to a memory, wherein the processor is configured to:
control communication with one of the second hardware devices;
execute paring between the information processing device and the control device, in accordance with a first near field communication of a predetermined scheme when the information processing device becomes a control target in a case in which control of combining of the first hardware devices and the second hardware devices and causing a predetermined series of processes to be executed is executed in the control device; and
receive an execution result of a program from the control device by a second near field communication of a predetermined scheme, the program created to function the information processing device serving as the control target and one or more of the second hardware devices connected to the information processing device.

8. An information processing method executed by an information processing device functioning as a first hardware device in an information processing system including a control device, a plurality of first hardware devices having a function of pairing with the control device through near field communication and a function of communicating with another hardware device, and a plurality of second hardware devices having a function of communicating with the first hardware devices and a function of fulfilling a predetermined function, the information processing method comprising:

controlling, by a control processor in the first hardware device, communication with one of the second hardware devices;
executing, by the control processor, paring between the information processing device and the control device in accordance with a first near field communication of a predetermined scheme when the information processing device becomes a control target in a case in which control of combining of the first hardware devices and the second hardware devices and causing a predetermined series of processes to be executed is executed in the control device; and
receiving, by the control processor, an execution result of a program from the control device by a second near field communication of a predetermined scheme, the program created to function the information processing device serving as the control target and one or more of the second hardware devices connected to the information processing device.

9. A non-transitory computer readable medium storing a program for causing a computer to execute a control processing, the computer controlling an information processing device functioning as a first hardware device in an information processing system including a control device, a plurality of first hardware devices having a function of pairing with the control device through near field communication and a function of communicating with another hardware device, and a plurality of second hardware devices having a function of communicating with the first hardware devices and a function of fulfilling a predetermined function, the program comprising functionality for:

controlling communication with one of the second hardware devices;
executing paring between the information processing device and the control device in accordance with a first near field communication of a predetermined scheme when the information processing device becomes a control target in a case in which control of combining of the first hardware devices and the second hardware devices and causing a predetermined series of processes to be executed is executed in the control device; and
receiving an execution result of a program from the control device by a second near field communication of a predetermined scheme, the program created to function the information processing device serving as the control target and one or more of the second hardware devices connected to the information processing device.

* * * * *